United States Patent
Ohr et al.

(10) Patent No.: US 7,620,765 B1
(45) Date of Patent: Nov. 17, 2009

(54) METHOD TO DELETE PARTIAL VIRTUAL TAPE VOLUMES

(75) Inventors: James P. Ohr, St. Paul, MN (US); Thomas L. Krinke, II, Forest Lake, MN (US)

(73) Assignee: Symantec Operating Corporation, Mountain View, CA (US)

( * ) Notice: Subject to any disclaimer, the term of this patent is extended or adjusted under 35 U.S.C. 154(b) by 398 days.

(21) Appl. No.: 11/611,681

(22) Filed: Dec. 15, 2006

(51) Int. Cl.
*G06F 12/00* (2006.01)
(52) U.S. Cl. .......................... 711/4; 711/162
(58) Field of Classification Search ........................ None
See application file for complete search history.

(56) References Cited

U.S. PATENT DOCUMENTS

| | | | |
|---|---|---|---|
| 6,779,077 B1 | 8/2004 | Bakke et al. | |
| 6,851,031 B2 | 2/2005 | Trimmer et al. | |
| 7,069,466 B2 | 6/2006 | Trimmer et al. | |
| 7,302,540 B1 * | 11/2007 | Holdman et al. | 711/162 |
| 2004/0044863 A1 | 3/2004 | Trimmer et al. | |
| 2004/0153739 A1 | 8/2004 | Trimmer et al. | |
| 2004/0181628 A1 | 9/2004 | Trimmer et al. | |
| 2004/0230724 A1 | 11/2004 | Stager et al. | |
| 2006/0074520 A1 | 4/2006 | Trimmer et al. | |
| 2006/0123189 A1 * | 6/2006 | Bitner et al. | 711/111 |
| 2007/0050329 A1 * | 3/2007 | Chikusa et al. | 707/2 |
| 2007/0136518 A1 * | 6/2007 | Slater | 711/111 |
| 2007/0174569 A1 * | 7/2007 | Schnapp et al. | 711/162 |

* cited by examiner

*Primary Examiner*—Brian R Peugh
(74) *Attorney, Agent, or Firm*—Robert C Kowert; Meyertons, Hood, Kivlin, Kowert & Goetzel, P.C.

(57) ABSTRACT

A virtual tape library may be configured to delete or free data blocks corresponding to expired backup images. A virtual tape volume may comprise multiple backup images, each corresponding to data stored by a backup application. The backup application may expire individual backup images of a virtual tape volume without expiring the entire virtual tape volume. In contrast to traditional virtual tape libraries, the virtual tape library described herein may delete, free and/or reuse the data blocks corresponding to expired backup images even before the entire virtual tape volume is expired.

22 Claims, 6 Drawing Sheets

METHOD TO DELETE PARTIAL VIRTUAL TAPE VOLUMES

BACKGROUND OF THE INVENTION

1. Field of the Invention

This invention relates generally to backup and archival systems, and more particularly, to a system and method for deleting partial virtual tape volumes in a virtual tape library.

2. Description of the Related Art

In the field of information technology, backup refers to the copying of data so that these additional copies may be restored after a data loss event. Backups are useful primarily for two purposes: to restore a computer to an operational state following a disaster (called disaster recovery) and to restore small numbers of files after they have been accidentally deleted or corrupted. Backups differ from archives in the sense that archives are the primary copy of data and backups are a secondary copy of data. Backup systems differ from fault-tolerant systems in the sense that backup systems assume that a fault will cause a data loss event and fault-tolerant systems assume a fault will not. Since a backup system contains at least one copy of all data worth saving, the data storage requirements can be considerable. Organizing this storage space and managing the backup process may be a complicated undertaking.

Magnetic tape is generally the most commonly used medium for bulk data storage, backup and archiving. There are myriad formats, many of which are proprietary or specific to certain markets like mainframes or a particular brand of personal computers. A tape drive is a data storage device that reads and writes data stored on a magnetic tape or a punched tape. It is typically used for archival storage of data stored on hard drives. Tape media generally has a favorable unit cost and long archival stability.

Instead of allowing random-access to data as hard disk drives do, tape drives only allow for sequential-access of data. A hard disk drive can move its read/write heads to any random part of the disk platters in a very short amount of time, but a tape drive must spend a considerable amount of time winding tape between reels to read any one particular piece of data. As a result, tape drives have very slow average seek times. Despite the slow seek time, tapes drives can stream data to tape very quickly.

A tape library is a storage device that may contain tape drives, slots to hold tape cartridges and an automated method for physically moving tapes within the device. These devices can store immense amounts of data. A Virtual Tape Library (VTL) is a data storage virtualization technology used typically for archival and backup purposes. In generic terms, a VTL presents a storage component (such as disk) as tapes available for use with tape drive and media changer emulations. In other words, a Virtual Tape Library (VTL) is a storage device that appears to be a tape library to backup software, but actually stores data by some other means. A VTL can be configured as a temporary storage location before data is actually sent to real tapes or it can be the final storage location itself.

Virtualizing the storage as tape hardware allows integration of VTLs with existing archiving policies and backup software while taking advantage of the benefits of storage virtualization. The benefits of tape virtualization include storage consolidation and faster data restore processes.

Most current VTL solutions use ATA or SATA disk arrays as the primary storage component due to their relatively low cost. By backing up data to disks instead of tapes, VTL often increases performance of both backup and recovery operations. In some cases, the data stored on the VTL's disk array is exported to other media, such as tapes, for disaster recovery purposes.

Small Computer System Interface (SCSI) is a standard interface and command set for transferring data between devices on both internal and external computer buses. SCSI is most commonly used for hard disks and tape storage devices, but also connects a wide range of other devices, including scanners, printers, CD-ROM drives, CD recorders, and DVD drives. In fact, the entire SCSI standard promotes device independence, which means that theoretically SCSI can be used with any type of computer hardware.

Fibre Channel is a gigabit-speed network technology primarily used for storage networking. Fibre Channel is standardized in the T11 Technical Committee of the InterNational Committee for Information Technology Standards (INCITS), an American National Standard Institute-accredited standards committee. It started for use primarily in the supercomputer field, but has become the standard connection type for storage area networks in enterprise storage. Despite its name, Fibre Channel signaling can run on both twisted-pair copper wire and fiber optic cables.

Traditionally, backup applications store backup images to tape volumes and generally expire backup images after a certain amount of time. In other words, an individual backup image may only be considered valid or necessary for a certain amount of time, generally until another version of the data needs to backed up. Generally, a tape volume may not be overwritten until all the backup images on that particular tape volume have expired. Traditional tape systems, including traditional virtual tape libraries have no mechanism for delete data associated with, or corresponding to, expired backup images. Instead, the expired backup images are overwritten after the entire tape volume has been expired and the backup software begins overwriting the expired tape volume. Additionally, traditional tape systems only overwrite tape volumes, and therefore backup images, starting at the beginning of the tape volume and proceeding sequentially.

SUMMARY

A virtual tape library may be configured to delete or free data blocks corresponding to expired backup images. As noted above, a virtual tape volume may include multiple backup images, each corresponding to data stored by a backup application. The backup application may expire individual backup images of a virtual tape volume without expiring the entire virtual tape volume. In contrast to traditional virtual tape libraries, the virtual tape library described herein may delete, free and/or reuse the data blocks corresponding to expired backup images even before the entire virtual tape volume is expired.

A backup application may notify the virtual tape library of expired backup images and in response the virtual tape library may determine which data blocks in disk-based storage store data corresponding to the expired backup images. The virtual tape library may then delete, free or de-allocate the determined data blocks. In addition, the virtual tape library may subsequently reuse the freed data blocks, such as to store data for additional, newly written, backup images.

Existing tape-specific backup APIs or commands may be extended to include commands for enabling the deleting of data corresponding to expired backup images. For example, the SCSI tape commands may be extended to include a command allowing a backup application to notify a virtual tape library of expired backup images, according to one embodiment. In other embodiments, a backup application may communicate with a virtual tape library in other manners. For instance, other types of network messages, such as TCP/IP, UDP, SMTP, SNMP and/or other types of messages, may be used to communicate with a virtual tape library. Additionally, other communication technologies, such as sockets, RMI and RPC may also be used, according to some embodiments.

BRIEF DESCRIPTION OF THE DRAWINGS

FIG. 6 is a block diagram illustrating an exemplary computer system capable of implementing deleting partial virtual tape volumes, according to one embodiment While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
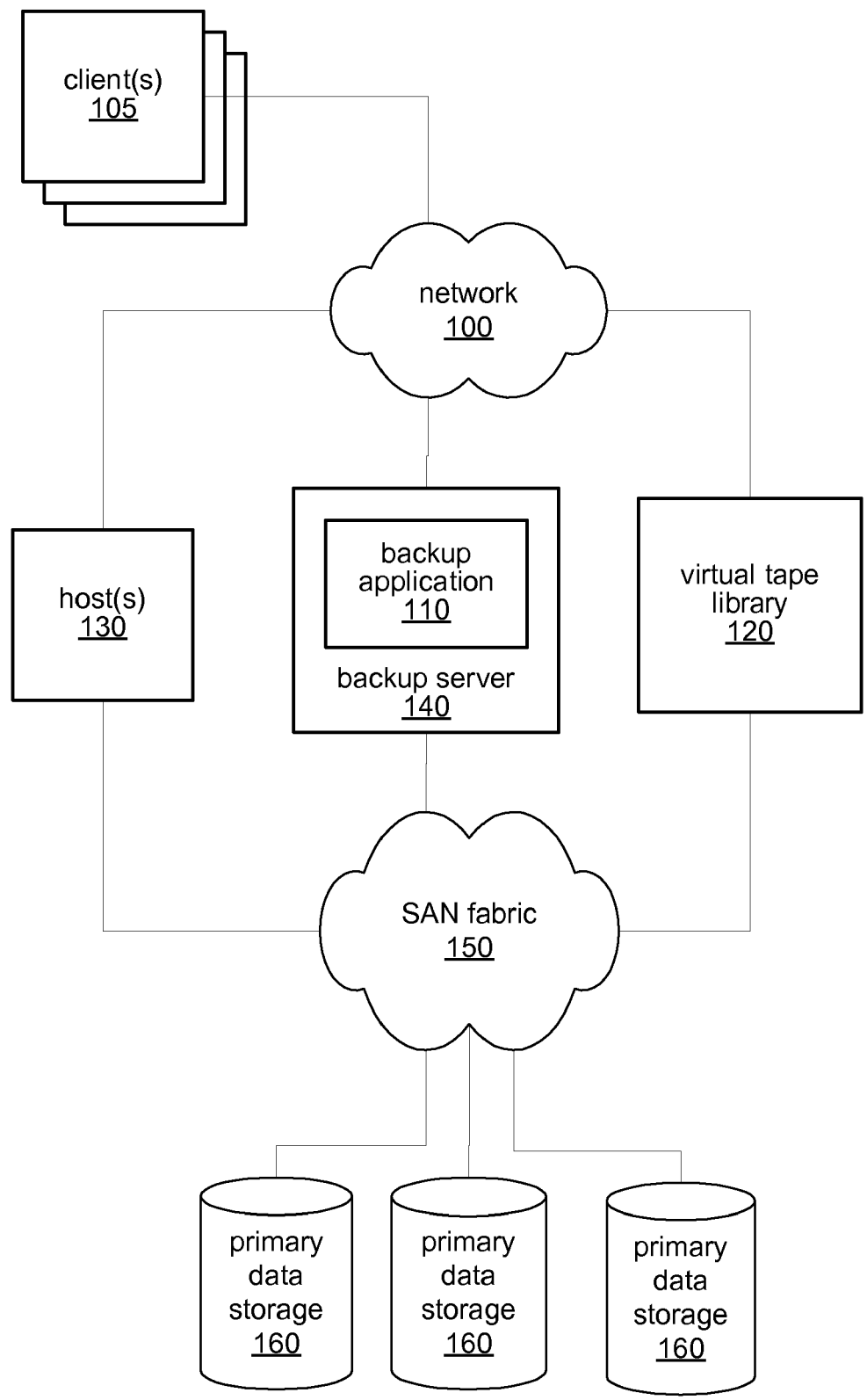
FIG. 1 is a block diagram illustrating a system of networked computers suitable for implementing deleting partial virtual tape volumes, in one embodiment.

As noted above, a virtual tape library may be configured to delete partial virtual tape volumes, according to some embodiments. FIG. 1 is a block diagram illustrating several network computers and other devices that may, in one embodiment, implement deleting partial virtual tape volumes, as described herein. For instance, virtual tape library 120 may be configured to present itself as a tape storage system to which backup applications, such as backup application 110 on backup server 140, may write or store backup images to backup tape volumes. As noted above, a tape volume may include multiple backup images, each corresponding to a particular set of data being backed up.

Virtual tape library 120 may implement a tape-specific storage interface and may allow other devices, applications and/or processes to read and write data through the tape-specific storage interface. For example, the SCSI command set includes commands for reading, writing and managing data on tape drives. Thus, in some embodiments, virtual tape library 120 may be configured to implement SCSI-based tape commands and to allow other applications, such as backup application 110 to utilize the SCSI tape commands to communicate with and store data to virtual tape library 120.

In some embodiments, virtual tape library 120 and backup server 140 may be coupled to Storage Area Network (SAN), such as SAN fabric 150. A storage area network (SAN) is a network designed to attach computer storage devices such as disk array controllers and tape libraries to servers. A SAN allows a machine to connect to remote targets such as disks and tape drives on a network for block level I/O. From the point of view of the class drivers and application software, the devices appear as locally attached devices. Storage networks are distinguished from other forms of network storage by the low-level access method that they use. Data traffic on these networks is very similar to those used for internal disk drives, like Advanced Technology Attachment (ATA) and SCSI.

In a storage network, a server may issue a request for specific blocks, or data segments, from specific disk drives. This method is known as block storage. The device acts in a similar fashion to an internal drive, accessing the specified block, and sending the response across the network.

In more traditional file storage access methods, like Server Message Block (SMB), Common Internet File System (CIFS) or Network File System (NFS), a server issues a request for an abstract file as a component of a larger file system, managed by an intermediary computer. The intermediary then determines the physical location of the abstract resource, accesses it on one of its internal drives, and sends the complete file across the network. In some embodiments SAN fabric 150 may represent a Fibre Channel SAN made up of a number of Fibre Channel switches connected together to form a fabric and utilizing the SCSI command set.

Backup server 140 and virtual tape library 120 may also be coupled to a LAN or other network, such as network 100, according to some embodiments. For instance, network 100 may represent an Ethernet network in some embodiments. Client 105, such as computers executing various system and applications may communicate over network 100 to hosts 130. Hosts 130 may be configured to manage data stored on one or more primary data storage systems 160, in one embodiment. For example, host 130 may be configured to provide file system functionality allowing client 105 to read, write, or delete data on primary data storage system 160. While described herein as involving backup application 110 backing up data to virtual tape library 120, in some embodiments, clients 105 and/or hosts 130 may backup data to virtual tape library 120 and may also expire backup images, as described herein.

Backup application 110 may periodically backup data from primary data storage 160 to virtual tape library, according to some embodiments. For example, backup application 110 may be configured to allow an administrator to configure what data should be backed up and how often. In some embodiments, backup application 110 may only be able to write data using tape specific commands and/or semantics. For example, in one embodiment, backup application 110 may only be able to use SCSI tape commands for backing up data. Thus, backup application 110 may periodically backup data from primary data storage 160 to virtual tape library 120. As noted above, a virtual tape library may appear to backup application 110 as a data storage system comprising tape drive, but in fact, may store data to disk based storage, such as to one or more disk drives.

The disk based storage of virtual tape library 120 may be configured in various manners. For example, in one embodiment, virtual tape library 120 may include multiple disk drives configured as a redundant array of independent disks (RAID) storage system. In other embodiments, virtual tape library 120 may include other disk based storage system, such as ATA or SATA disk arrays, single hard drives, etc. Additionally, virtual tape library 120 may implement some form of file system or other mechanism to manage and keep track of data stored on the disk based storage.

After storing data to virtual tape library 120, backup application 110 may be configured to expire backup images that are older than a certain specified age. For instance, in one embodiment backup application 110 may be configured to expire any backup image that over a week old. In other embodiments, however, backup images may be expired after different amounts of time and backup application 110 may be configured to expire different backup images after different amounts of time, such as based on the type and/or priority of the data.

Backup application 110 may also expire backup image for reasons unrelated to the age of the backup images. For instance, in some embodiments, backup application 110 may expire backup images in response to any of various types of events. For example, in one embodiment backup application 110 may expire backup images in response to the virtual tape library 120 have less than a specified amount of disk-based storage available. By expiring backup images, backup application 110 may allow virtual tape library 120 to free up and reuse the data stored for those backup images. In another embodiment, backup application 110 may expire backup images in response to a primary copy of the data (that was also backed up) having reached a certain size. In yet other embodiments, backup application 110 may expire backup images based on backup policies or in response to a user event, such as an administrator desiring to free up additional storage space in virtual tape library 120. In general, backup application 110 may be configured to expire backup images in response to various events, according to different embodiments.

As noted above, traditional virtual tape libraries cannot delete individual backup images from a virtual tape volume. Please note that as used herein, a virtual tape volume represents all of the data stored on a virtual tape, include a tape label and any metadata configuration or management data associated with the tape volume. A backup image, as used herein, refers to an individual set of data backed up to a virtual tape volume. A single tape volume may include multiple backup images and a virtual tape library may store and manage multiple virtual tape volumes.

However, as described herein, virtual tape library 120 may be configured to delete partial virtual tape volumes. For instance, virtual tape library 120 may store data corresponding to backup images on disk based storage and may be configured to delete the data on the disk based storage that corresponds to an individual backup image once that particular backup image has been expired by the backup application. In other words, after a backup application, such as backup application 110, expires a particular backup image, the backup application may not expect that data to still be available, and therefore virtual tape library 120 may delete the data corresponding to the expired backup image. After freeing the data corresponding to an expired backup image, virtual tape library 120 may reuse the freed data blocks for other purposes, such as to store data corresponding to other subsequent backup images of existing or new virtual tape volumes.

If backup application 110 attempts to read data from an expired backup image after virtual tape library has deleted the corresponding data from the disk based storage, virtual tape library may return all zeros or some other specific data pattern, such as to indicate that the data is no longer available, according to some embodiments. In other embodiments, virtual tape library 120 may be configured to notify a backup application that it is attempting to read data from an expired backup image in some other manner, such as by return an error condition, for instance.

Figure 2:
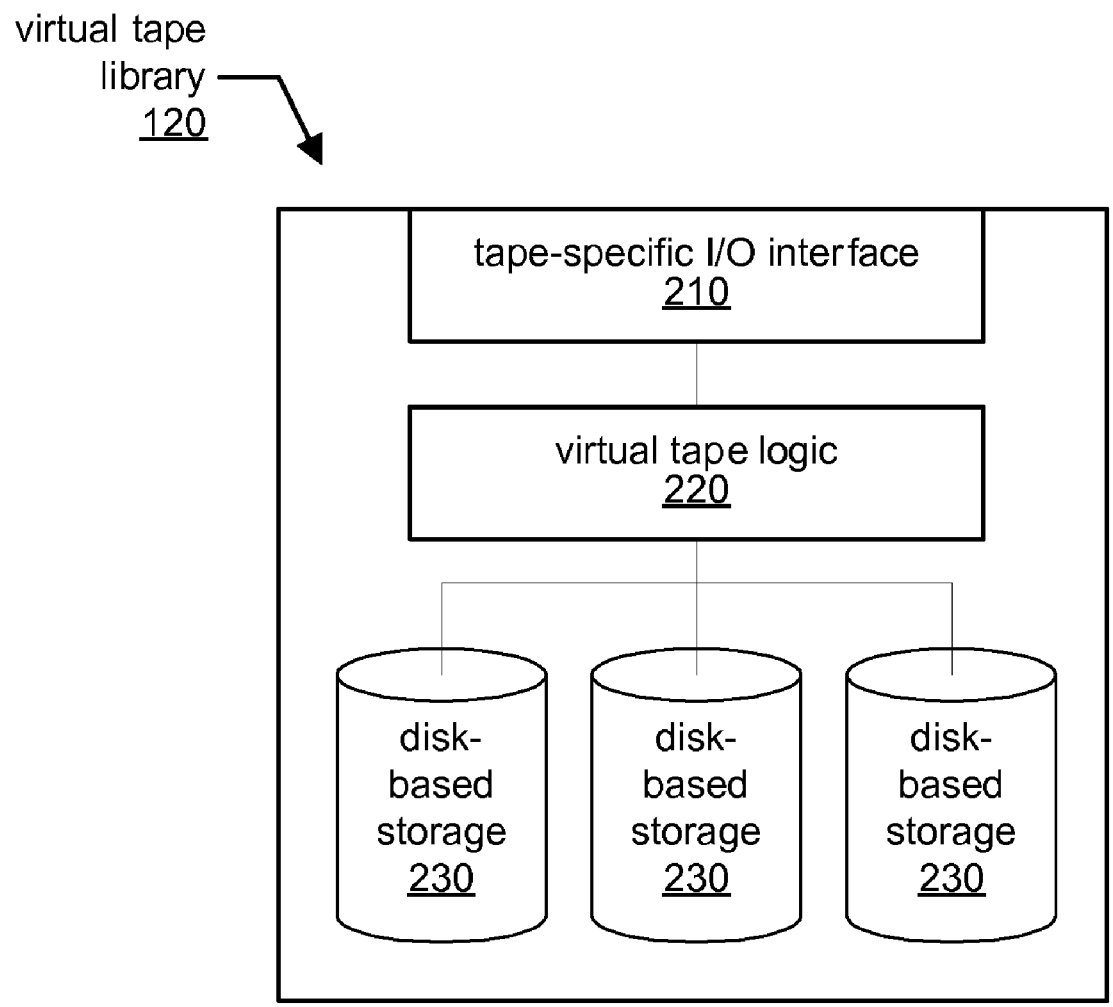
FIG. 2 is a block diagram illustrating one embodiment of a virtual tape library as described herein.

FIG. 2 is a block diagram illustrating one embodiment of a virtual tape library, as described herein. As noted above, virtual tape library 120 may be coupled to a SAN and/or to other network technology, such as Ethernet. Thus, as illustrated in FIG. 2, virtual tape library 120 may, in some embodiments, include tape-specific I/O interface 210 configured to couple to and communicate over one or more of various types of communication media, such as SAN fabric 150 and/or network 100. For example, tape-specific I/O interface 210 may be configured to send and receive data, SCSI tape commands and responses over SAN fabric 150 in one embodiment. In another embodiment, tape-specific I/O interface 210 may also be configured to communicate over network 100 using any of various protocols, such as TCP/IP. For instance, in some embodiments, backup application 110 may be configured to communicate with virtual tape library 120 over both SAN fabric 150 and network 100.

Virtual tape library 120 may also include virtual tape logic 220 in some embodiments. Virtual tape logic 220 may be embodied in hardware, software or both, according to different embodiments. Virtual tape logic 220 may include logic for receiving and storing data according via tape-specific I/O interface and may also include logic for managing the writing, reading, deleting and, in general, the management of data on disk-based storage devices 230. In some embodiments, virtual tape logic 220 may be configured to maintain mappings between virtual tape volumes, backup images and data stored on disk-based storage 230. In one embodiment, virtual tape logic 220 may be configured to receive notifications of expired backup images from backup application 110 and in response free up and/or reuse data block corresponding to the expired backup images.

Please note that virtual tape library 120 may also include other items not shown in FIG. 2. For instance, virtual tape library 120 may include one or more processors and memory coupled to the processors configured to store program instructions executable by the processor(s) to implement the functionality described herein regarding virtual tape library 210, such as freeing and/or reusing data blocks corresponding to expired backup images. For example, in some embodiments, virtual tape logic 220 may comprise such a processor and memory, as noted above. Additionally, please note that FIG. 2 represents merely one possible embodiment of a virtual tape library. In other embodiments, virtual tape library 120 may include additional features, logic, devices, etc.

Figure 3A:
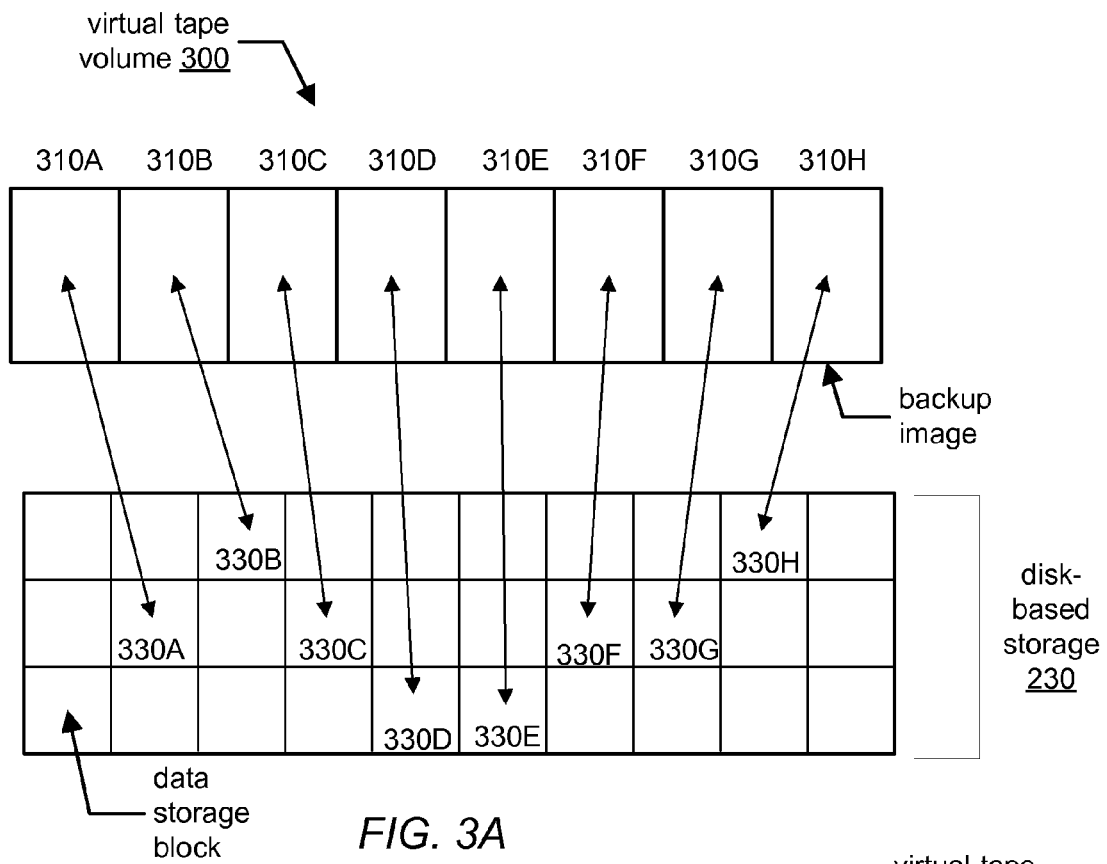
FIGS. 3A and 3B are block diagrams illustrating the logical connection between individual backup images and the underlying data storage, according to one embodiment.

As noted above, virtual tape library 120 may be configured to store data on disk-based storage. FIG. 3A is a block diagram illustrating, according to one embodiment, the logical association between a tape volume, backup images and disk based storage. In FIG. 3A, virtual tape volume 300 includes eight individual backup images 310A-310H. Please note that FIG. 3A illustrates only one tape volume and only eight backup images for ease of discussion. In other embodiments, virtual tape library 120 may be configured to store, maintain and/or manage many more virtual tape volumes and backup images. Also illustrated in FIG. 3A is disk-based storage 230 that, in some embodiments, may represent any of various types of disk-based storage systems.

Since, virtual tape library 120 may store the data corresponding to the backup images to disk-based storage, in some embodiments, the actual data stored to the disk-based storage may not be maintain in the same sequential order as the order in which the backup images were written to virtual tape library 120. Thus, FIG. 3A illustrates with double headed arrows the data blocks storing data associated with individual backup images 310A-310H. Please note that while FIG. 3A illustrates exactly one data block for each backup image, in other embodiments, such a one to one correspondence may not exist. In other embodiments, virtual tape library 120 may utilize more than one data block of the disk-based storage for each backup image. Additionally, the amount of disk-based storage required to store data corresponding to a single backup image may vary considerably from backup image to backup image and from embodiment to embodiment.

Figure 3B:
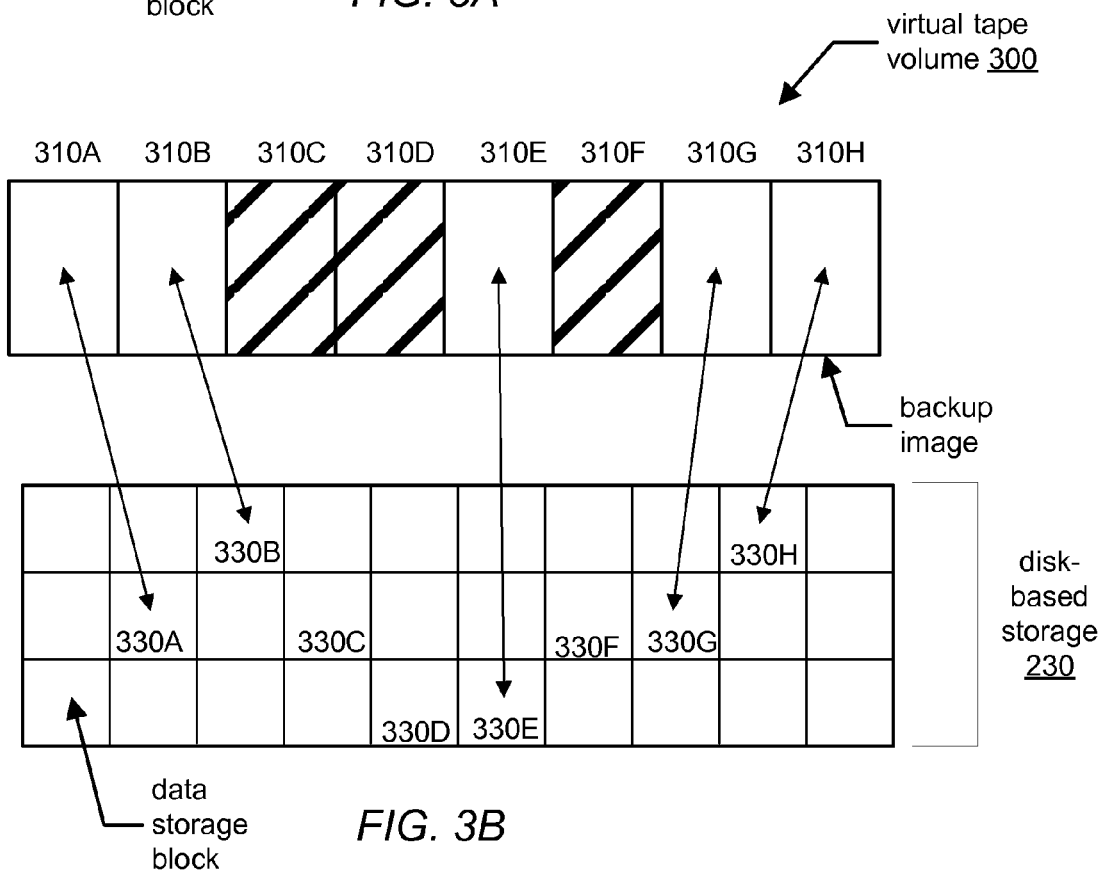

Thus, as illustrated in FIG. 3A, data for backup images 310A-310H may be stored in data blocks 330A-330H, respectively. As noted above, backup application 110 may be configured to expire one or more backup images, such as after a certain amount of time in one embodiment. FIG. 3B illustrates the logical associations between backup images and blocks of disk-based storage after three backup images have been expired. Specifically, FIG. 3B illustrates that backup images 310C, 310D and 310F have been expired by backup application 110, according to one embodiment. An expired backup image may remain part of the virtual tape volume until the entire tape volume is expired and/or vaulted, in some embodiments.

When backup application 110 expires a backup image, backup application may, in some embodiments, update a table or other data structure holding information regarding backup image and tape volumes. In addition, backup application 110 may, in some embodiments, notify virtual tape library 120 of the expired backup images. Backup application 110 may notify virtual tape library 120 of expired backup images in various manners. For instance, in one embodiment, the SCSI command set may be expanded to include a specify command for notifying virtual tape library of expired backup images and backup application 110 may use such an expanded SCSI command. For example, backup application 110 may issue an extended SCSI tape command and include a media ID identifying the particular tape volume and one or more block IDs identifying the particular backup images to expire. A command that following the same route as data may be referred to as an in-band command. Thus, if backup application 110 uses SCSI commands to send data to virtual tape library 120 for storage and also uses an extended SCSI command to notify virtual tape library 120 of expired backup images, the notification may be considered an in-band command.

Alternatively, in other embodiments, backup application 110 may be configured to use an out-of-band command to notify virtual tape library 120 of expired backup images. As used herein, an out-of-band command may be considered any command that does not follow the same pathway as the data being stored. For instance, in one embodiment, backup application 110 may be configured to send an Ethernet, or TCP/IP message over network 100 to notify virtual tape library 120 of expired backup images. In general, any suitable method of inter-process communication may be used by backup application 110 to notify virtual tape library 120 of expired backup images.

Please note that the above examples describing the use of extended SCSI commands and/or TCP/IP messages to communicate with virtual tape library 120 are merely two of various possible embodiments. In other embodiments, a backup application may communicate with a virtual tape library in other manners. For instance, other types of network messages, such as TCP/IP, UDP, SMTP, SNMP and/or other types of messages, may be used to communicate with a virtual tape library. Additionally, other communication technologies, such as sockets, RMI and RPC may also be used, according to some embodiments.

Backup application 110 may specify or indicate expired backup images in various ways, according to different embodiments. For example, backup application 110 may indicate which backup images are expired by providing a media ID along with the block IDs identifying the particular backup images to expire, as noted above. Additionally, backup application 110 may indicate the backup images by providing an initial block ID indicating the first backup image to expire along with an indication of how many contiguous backup images to expire after the first backup image. In general, any suitable method of specifying or indicating individual, multiple or ranges of backup images may be used by backup application 110 in various embodiments.

In response to backup application 110 expiring backup images, virtual tape library 120 may free, delete or de-allocate the data corresponding to the expired backup images from disk-based storage 230. Referring again to FIG. 3B, backup images 310C, 310D and 310F are indicated as expired. Additionally, those expired backup images are no longer mapped to data blocks 330C, 330D and 330F. When freeing up data blocks corresponding to expired backup images, virtual tape library 120 may update an internal mapping of data blocks, in one embodiment. In other embodiments, however, virtual tape library 120 may free, delete or de-allocate data block corresponding to expired backup images in different manners depending upon the organization and management of disk-based storage 230, according to various embodiments. For instance, disk-based storage 230 may be organized as a file system where the data for each backup image is stored in an individual file. Therefore, in one embodiment, virtual tape library 120 may issue a file delete command for each backup image. In other embodiments, the data on disk-based storage 230 may be organized and managed in different manner and therefore virtual tape library 120 may free up data corresponding to expired backup images in different manners.

In some embodiments, a tape volume including expired backup images may be considered a sparse data image since it may contain logical backup images that are not mapped to actual physical data storage. Most file systems organize their files as a (not necessarily contiguous) sequence of disk blocks. If one of these files include sections that have not been written to block needs not be allocated on disk for those sections. For example, an application may create a file but may not write any data before file offset 2000. In such an example, no actual data blocks may be allocated for the first 2000 bytes of the file. Such files with unallocated blocks may be called sparse files.

Since, as noted above, backup application 110 may view virtual tape library 120 as a tape-based storage system, backup application 110 may not be able to reuse expired backup images until the entire tape volume containing those backup images has been expired. Since, tape drives only allow sequential access of data, there may be no way for backup application 110 to overwrite an expired backup image until the entire tape volume is reused.

Figure 4:
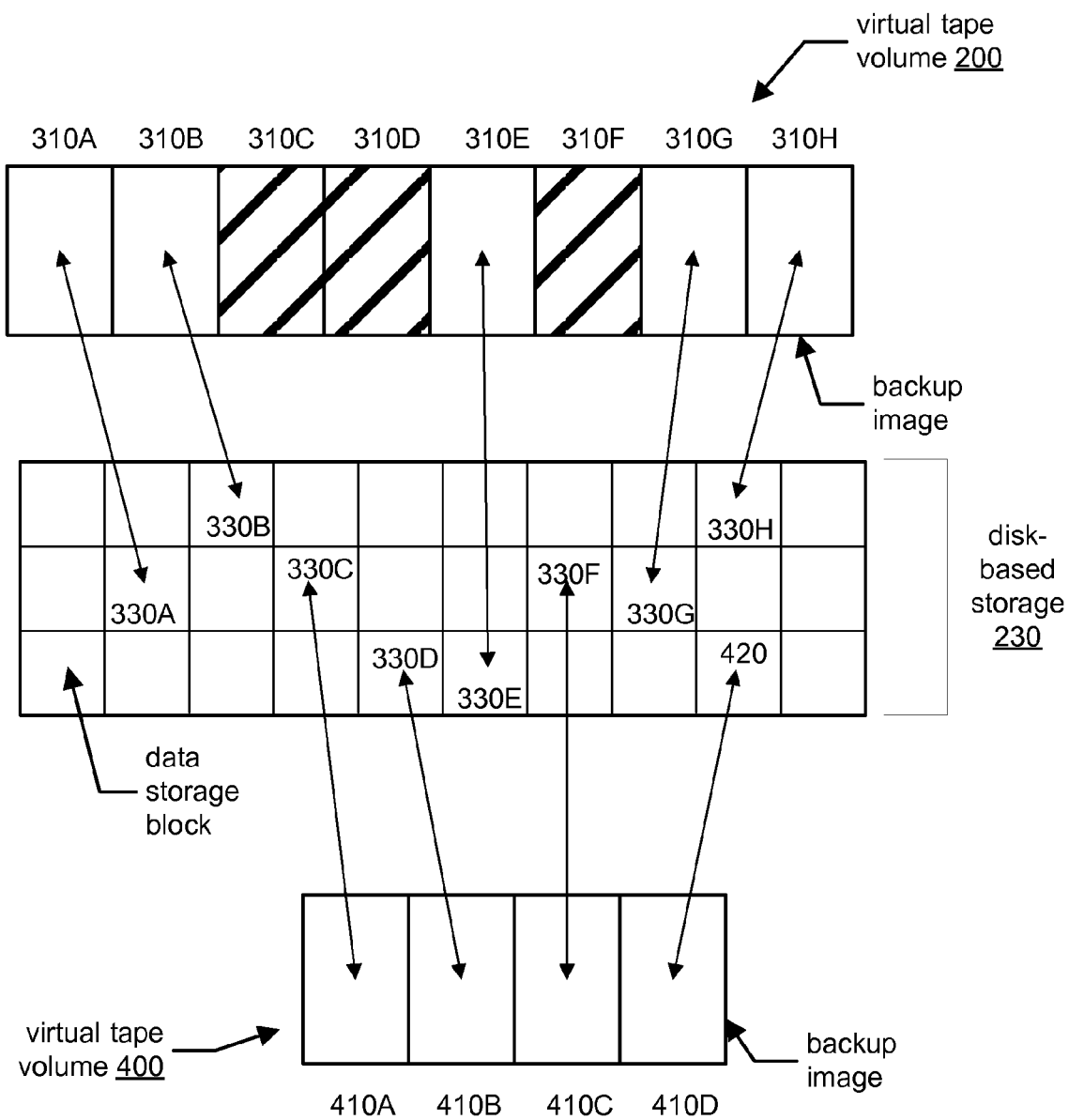
FIG. 4 is a block diagram illustrating the reuse of freed data blocks corresponding to expired backup images, in one embodiment.

After deleting the data corresponding to expired backup images from disk-based storage, virtual tape library 120 may be configured to reuse the freed data blocks in some embodiments. FIG. 4 is block diagram illustrating the reuse of data blocks corresponding to expired backup images, according to one embodiment. As shown in FIG. 4, the data blocks previously storing data corresponding to the three expired backup images 310C, 310D and 310F are reused to store data corresponding to newly written backup images 410A, 410B and 410C of virtual tape volume 400. Virtual tape volume 400 also includes backup image 410D whose data is stored in data block 420. In addition to reusing data block corresponding to expired backup images to store data for future backup images, in some embodiments virtual tape library 120 may be configured to reuse those data blocks for other purposes, such as to store metadata or other information for managing disk-based storage 230.

Please note that there may be no user interaction involved or required for virtual tape library 120 to delete and reuse data corresponding to expired backup images. For instance, in some embodiments, the only user interaction may be an administrator configuring virtual tape library and/or backup application 110 to delete and reuse data corresponding to expired backup images. In one embodiment, an administrator may use a configuration feature of backup application 110 to indicate that virtual tape library 120 should delete and reuse data corresponding to expired backup images and backup application 110 may in turn notify virtual tape library that data corresponding to expired backup images should be freed and/or reused. Additionally, an administrator may use a configuration feature of backup application 110 to indicate that backup application 110 should notify virtual tape library 120 of expired backup images. In other embodiments, an administrator may configure backup application 110 and virtual tape library 120 separately.

Figure 5:
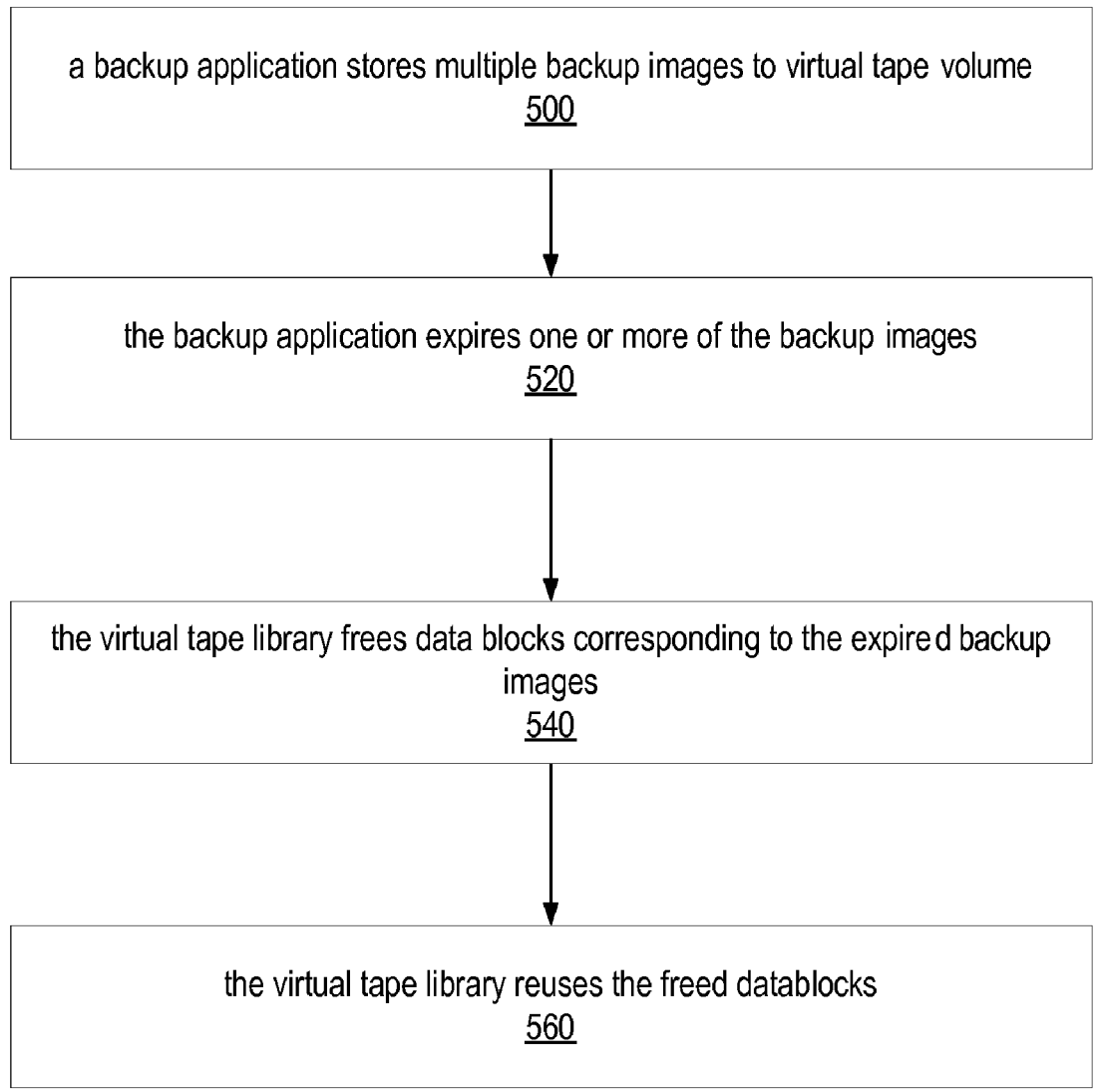
FIG. 5 is a flowchart illustrating one embodiment of a method for deleting partial virtual tape volumes, as described herein.

FIG. 5 is a flowchart illustrating one embodiment of a method for deleting partial virtual tape volumes. As described above, a virtual tape library may be configured to delete or free data blocks corresponding to expired backup images. As noted above, a virtual tape volume may include multiple backup images. Thus, as illustrated by block 500, a backup application, such as backup application 110, may store multiple backup images to a virtual tape volume. In some embodiments, backup application 110 may utilize a particular tape backup API, such as provide by the SCSI command set, to communicate with virtual tape library 120 and store data to backup images in a virtual tape volume. For example, as described above regarding FIG. 3A, backup application 110 may store backup images 310A-310H to virtual tape volume 300. Please note that backup application 110 may not be able to tell that the data stored to virtual tape volume 300 via virtual tape library 120 is stored to a disk based storage rather than to physical tape.

Subsequently, such as after a specified period of time, backup application 110 may expire one or more of the backup images on virtual tape volume 200, as indicated by block 520. For instance, backup application 110 may be configured to expire backup images after a certain amount of time, such as 1 week, according to one embodiment. In some embodiments, backup application 110 may be configured to expire different backup images after different amounts of time. For example, backup application 110 may expire backup images containing different types of data after different amounts of time. Thus, the expired backup images may or may not be logically contiguous in the virtual tape volume. Please note that, as described above, backup application 110 may be configured to expire backup images for any of various reasons including, but not limited to, the age of backup images, backup policies, available storage space, user actions and/or other events.

When expiring backup images, backup application 110 may be configured to notify virtual tape library 120 of the expired images, according to one embodiment. Backup application 110 may notify virtual tape library 120 in any of various methods, according to different embodiments. For instance, in some embodiments, a custom SCSI tape command may be used by backup application 110 to notify virtual tape library 120 of expired backup images. When backup application 110 uses the same message path to notify virtual tape library of expired images as used to read and store data to the virtual tape library, the notification may be said to be an in-band message, according to one embodiment. In other embodiments, backup application 110 may be configured to utilize one or more out-of-band messages to notify virtual tape library 120 of expired images. For instance, in one embodiment, backup application 110 may send a custom network message over a LAN, such as network 100, to notify virtual tape library 120 of expired messages. In general backup application 110 may utilized virtually any method of inter-device, and/or inter-process communication to notify virtual tape library 120 of expired images, according to various embodiments.

In response to backup application 110 notifying virtual tape library 120 of the expired images, virtual tape library 120 may, in one embodiment, free data blocks corresponding to the expired backup images, as indicated by block 540. As noted above, virtual tape library 120 may present itself as a tape-based storage system, but in fact, may store data to disk-based storage. When a backup application expires backup images of a virtual tape volume, virtual tape library 120 may then deallocate, free, or otherwise make available for reuse, the data blocks used to store the data of the expired backup images, in one embodiment.

As noted above, virtual tape library 120 may manage the data blocks used to store backup image data in any of various manners, according to different embodiments. For example, in one embodiment virtual tape library 120 may utilize a file system and maintain one file per backup image to keep track of the backup image data. In another embodiment, virtual tape library 120 may maintain its own set of metadata linking backup images to data blocks and to keep track of which data blocks are allocated and/or free. Thus, the particular method used by virtual tape library 120 to free up the data blocks corresponding to the expired backup images may vary from embodiment to embodiment.

After freeing the data blocks corresponding to the expired backup images, virtual tape library 120 may subsequently reuse the freed data blocks, as illustrated in block 560. Virtual tape library 120 may be configured to reuse the freed data block in various manners, according to different embodiments. In some embodiments, virtual tape library 120 may reuse the freed data block by storing data corresponding to other backup images subsequently written by backup application 110. In other embodiments, the freed data blocks may be reused to store other information. In general freed data blocks may be reused in virtually any manner by virtual tape library 120.

Figure 6:
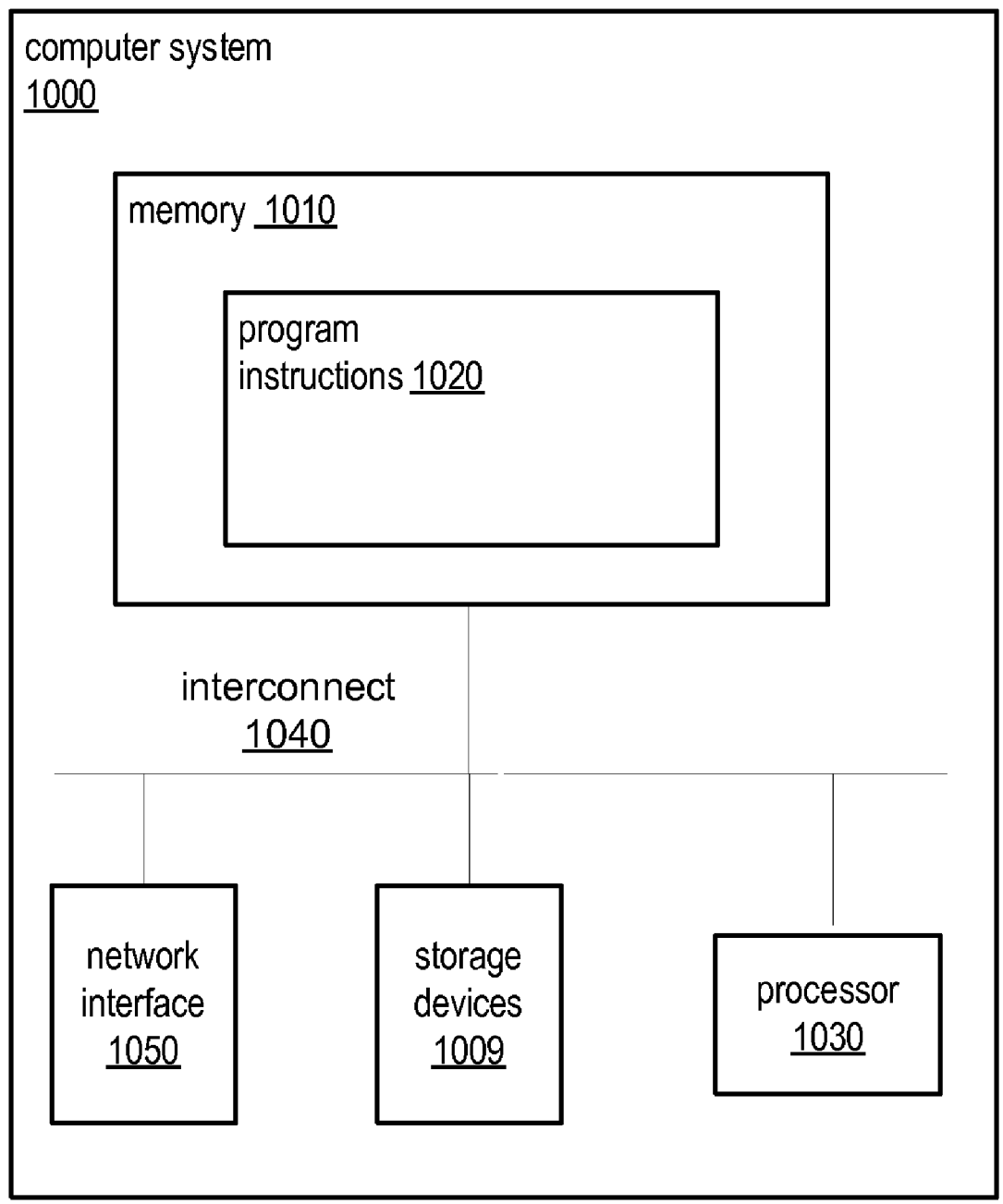

FIG. 6 illustrates a computing system capable of implementing deleting partial virtual tape volumes, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. Additionally, computer system 1000 may represent a virtual tape library, such as virtual tape library 120 and/or a backup server, such as backup server 140, both described above and according to various embodiments.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single threaded processor, a multi-threaded processor, a multi-core processor, etc.). The computer system 1000 also includes one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and a storage device(s) (e.g., optical storage, magnetic storage, etc.). The memory medium may include other types of memory as well, or combinations thereof. Embodiments of the invention may include fewer or additional components not illustrated in FIG. 10 (e.g., video cards, audio cards, additional network interfaces, peripheral devices, etc.). The processor unit 1030, the storage device(s) 1009, the network interface 1050, and the system memory 1010 are coupled to the system interconnect 1040. One or more of the system memories 1010 may embody a backup application, such as backup application 120, and/or a virtual tape library, such as virtual tape library 120, described above.

In some embodiments, memory 1010 may include program instructions 1020 configured to implement a virtual tape library, such as virtual tape library 120, configured to delete partial virtual tape volumes, as described herein. Furthermore, program instructions 1020 may be configured to implement a backup application 110, configured to delete partial virtual tape volumes, as described herein. Virtual tape library 120, backup application 110 may each be implemented in any of various programming languages or methods. For example, in one embodiment, virtual tape library 120 and backup application 110 may be JAVA based, while in other embodiments, they may be written using the C or C++ programming languages. Moreover, in some embodiments, virtual tape library 120, and backup application 110 may not be implemented using the same programming language. For example, backup application 110 may be C++ based, while virtual tape library 120 may be developed using C.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
   a processor; and
   memory coupled to the processor, wherein the memory comprises program instructions executable by the processor to implement a virtual tape library, wherein the virtual tape library is configured to store data to disk-based storage while appearing to a tape backup application as a tape-based storage device;
   wherein the virtual tape library is configured to:
      receive one or more tape-specific write commands from the backup application indicating data to be stored as a plurality of backup images to a same tape volume;
      store the data as a virtual tape volume in a plurality of data storage blocks of the disk-based storage;
      receive a command from the backup application indicating that at least one, but less than all, of the backup images stored as the virtual tape volume are expired; and
      free for reuse one or more of the plurality of data storage blocks storing data for the one or more expired backup images.

2. The system of claim 1, wherein the virtual tape library is further configured to:
   receive a read command from the backup application, wherein the read command indicates one of the expired backup images; and
   send a response to the backup application, wherein the response indicating that the data for the one of the expired backup image is not longer available for reading.

3. The system of claim 1, wherein the virtual tape library is further configured to:
   receive an additional tape-specific write command from the backup application indicating data to be stored as a backup image in the same virtual tape volume, a new virtual tape volume, or an existing virtual tape volume; and
   in response to receiving the additional tape-specific write command, store the data indicated by the new write command in one or more of the freed data storage blocks.

4. The system of claim 1, wherein said receiving one or more tape-specific write commands comprises receiving one or more small computer system interface (SCSI) commands over a SAN fabric from the backup application.

5. The system of claim 1, wherein said receiving a command from the backup application comprises receiving a SCSI command over a SAN fabric.

6. The system of claim 1, wherein said receiving a command from the backup application comprises receiving a Transmission Control Protocol/Internet Protocol (TCP/IP) message over an Ethernet network.

7. A method, comprising:
receiving a plurality of tape-specific write commands from a backup application indicating data to be stored as a plurality of backup images to a same tape volume;
storing the data as a virtual tape volume in a plurality of data storage blocks of a disk-based storage;
receiving a command from the backup application indicating that at least one, but less than all, of the backup images stored as the virtual tape volume are expired; and
freeing for reuse one or more of the plurality of data storage blocks storing data for the one or more expired backup images.

8. The method of claim 7, further comprising:
receiving a read command from the backup application, wherein the read command indicates one of the expired backup images; and
sending a response to the backup application, wherein the response indicates that the data for the one of the expired backup image is not longer available for reading.

9. The method of claim 7, further comprising:
receiving an additional tape-specific write command from the backup application indicating data to be stored as a backup image in the same, a new, or an existing tape volume; and
in response to receiving the additional tape-specific write command, storing the data indicated by the new write command in one or more of the freed data storage blocks.

10. The method of claim 7, wherein said receiving one or more tape-specific write commands comprises receiving one or more small computer system interface (SCSI) commands over a SAN fabric from the backup application.

11. The method of claim 7, wherein said receiving a command from the backup application comprises receiving a SCSI command over a SAN fabric.

12. The method of claim 7, wherein said receiving a command from the backup application comprises receiving a Transmission Control Protocol/Internet Protocol (TCP/IP) message over an Ethernet network.

13. A system, comprising:
a disk-based storage device;
a virtual tape library device; and
a backup server device;
wherein the backup server device is configured to send a plurality of tape-specific write commands to the virtual tape library device, wherein the plurality of commands indicate data to be stored as a plurality of backup images to a same tape volume;
wherein the virtual tape library device is configured to store, in response to receiving the plurality of tape-specific write commands, the data as a virtual tape volume in a plurality of data storage blocks of the disk-based storage device;
wherein the backup server device is further configured to send a command indicating that at least ones but less than all, of the backup images stored as the virtual tape volume are expired; and
wherein the virtual tape library device is further configured to, in response to receiving the command, free for reuse one or more of the plurality of data storage blocks storing data for the expired backup images.

14. The system of claim 13, further comprising:
wherein the backup server device is further configured to send an additional tape-specific write command to the virtual tape library device indicating data to be stored as a backup image in the same, a new, or an existing tape volume; and
wherein the virtual tape library device is further configured to store, in response to receiving the additional tape-specific write command, data indicated by the new write command in one or more of the freed data storage blocks.

15. The system of claim 13, further comprising:
wherein the backup server device is further configured to send the one or more tape-specific write commands as one or more small computer system interface (SCSI) commands over a SAN fabric to the virtual tape library device; and
wherein the virtual tape library device is further configured to receive the one or more tape-specific write commands as one or more small computer system interface (SCSI) commands over a SAN fabric from the backup application.

16. The system of claim 13, further comprising:
wherein the backup server device is further configured to send the command indicating the one or more expired backup images as a SCSI command over a SAN fabric to the virtual tape library device; and
wherein the virtual tape library device is further configured to receive the command indicating the one or more expired backup images as a SCSI command over a SAN fabric from the backup server device.

17. The method of claim 13, further comprising:
wherein the backup server device is further configured to send the command indicating the one or more expired backup images as a Transmission Control Protocol/Internet Protocol (TCP/IP) message over an Ethernet network to the virtual tape library device; and
wherein the virtual tape library device is further configured to receive the command indicating the one or more expired backup images as Transmission Control Protocol/Internet Protocol (TCP/IP) message over an Ethernet network from the backup server device.

18. The method of claim 13, wherein the backup server device is configured to send the command indicating that at least one but less than all of the backup images are expired in response to determining that the at least one of the backup images is older than a specified age.

19. The method of claim 13, wherein the backup server device is configured to send the command indicating that at least one but less than all of the backup images are expired in response to an event.

20. A method, comprising:
sending a plurality of tape-specific write commands to a virtual tape library, wherein the plurality of commands indicate data to be stored as a plurality of backup images to a same tape volume;
determining that at least one, but less than all, of the backup images are expired; and
sending one or more commands to the virtual tape library indicating that the at least one, but less than all, of the backup images are expired.

21. A system, comprising:
a processor; and a memory coupled to the processor, wherein the memory comprises program instructions executable by the processor to:
  send a plurality of tape-specific write commands to a virtual tape library, wherein the plurality of commands indicate data to be stored as a plurality of backup images to a same tape volume;
  determine that at least one, but less than all, of the backup images are expired; and
  send one or more commands to the virtual tape library indicating that the at least one, but less than all, of the backup images are expired.

22. A computer-readable storage medium, comprising program instructions computer-executable to implement:
  receiving a plurality of tape-specific write commands from a backup application indicating data to be stored as a plurality of backup images to a same tape volume;
  storing the data as a virtual tape volume in a plurality of data storage blocks of a disk-based storage;
  receiving a command from the backup application indicating that at least one, but less than all, of the backup images stored to the virtual tape volume are expired; and
  freeing for reuse one or more of the plurality of data storage blocks storing data for the one or more expired backup images.

* * * * *